United States Patent [19]

Lauderdale

[11] Patent Number: 5,068,000
[45] Date of Patent: Nov. 26, 1991

[54] METHOD OF MAKING A REINFORCING FABRIC FOR POWER TRANSMISSION BELTS, HOSES AND THE LIKE

[75] Inventor: Harold L. Lauderdale, Lanett, Ala.

[73] Assignee: West Point Pepperell, Inc., West Point, Ga.

[21] Appl. No.: 485,998

[22] Filed: Feb. 27, 1990

[51] Int. Cl.$^5$ .................... D06C 27/00; D06C 13/12; D06C 3/04

[52] U.S. Cl. .................................. 156/148; 156/164; 156/229; 427/176; 26/51.3

[58] Field of Search ................ 427/176; 156/164, 229, 156/148, 137, 267; 26/51.3, 51.4, 51

[56] References Cited

U.S. PATENT DOCUMENTS

| | | | |
|---|---|---|---|
| 2,709,475 | 5/1955 | Steckel et al. | 156/164 |
| 3,784,427 | 1/1974 | Griffin | |
| 4,062,989 | 12/1977 | Long | 427/176 |
| 4,622,243 | 11/1986 | Long | 427/176 |

*Primary Examiner*—Michael W. Ball
*Assistant Examiner*—Jeff H. Aftergut
*Attorney, Agent, or Firm*—Schweitzer Cornman & Gross

[57] ABSTRACT

A process for the production of bias-oriented reinforcing fabrics for the manufacture of power transmission belts, hoses and the like. The fabric is initially woven on a high speed, flat shuttleless loom, then immersed in a warm liquid solution to soften the sizing. The fabric is then processed to displace one selvedge longitudinally relative to the other, to achieve the desired bias angle of the weft yarns, usually about 120/60° to the warp yarns. After partial drying, and fine adjustment of bias angle in a weft straightener, the fabric is gripped at its selvedges by a clip tenter and retained with the desired bias orientation while being dried. The dry fabric is substantially stabilized in its desired bias orientation. The selvedge edges are then trimmed off hot knives and the trimmed fabric is collected on a roll for shipment to and use by the belt/hose manufacturer, where it is calendered with a rubber compound and banner cut into rhomboid-like sections. These are spliced in a known manner and slit into strips for incorporation in the ultimate product. Fabric processed according to the invention is greatly superior to the conventional in overall quality, uniformity, freedom from defects, etc. When using the fabric processed according to the invention, important reductions may be achieved in the labor component of the manufacture of reinforced hoses, belts, etc.

7 Claims, 2 Drawing Sheets

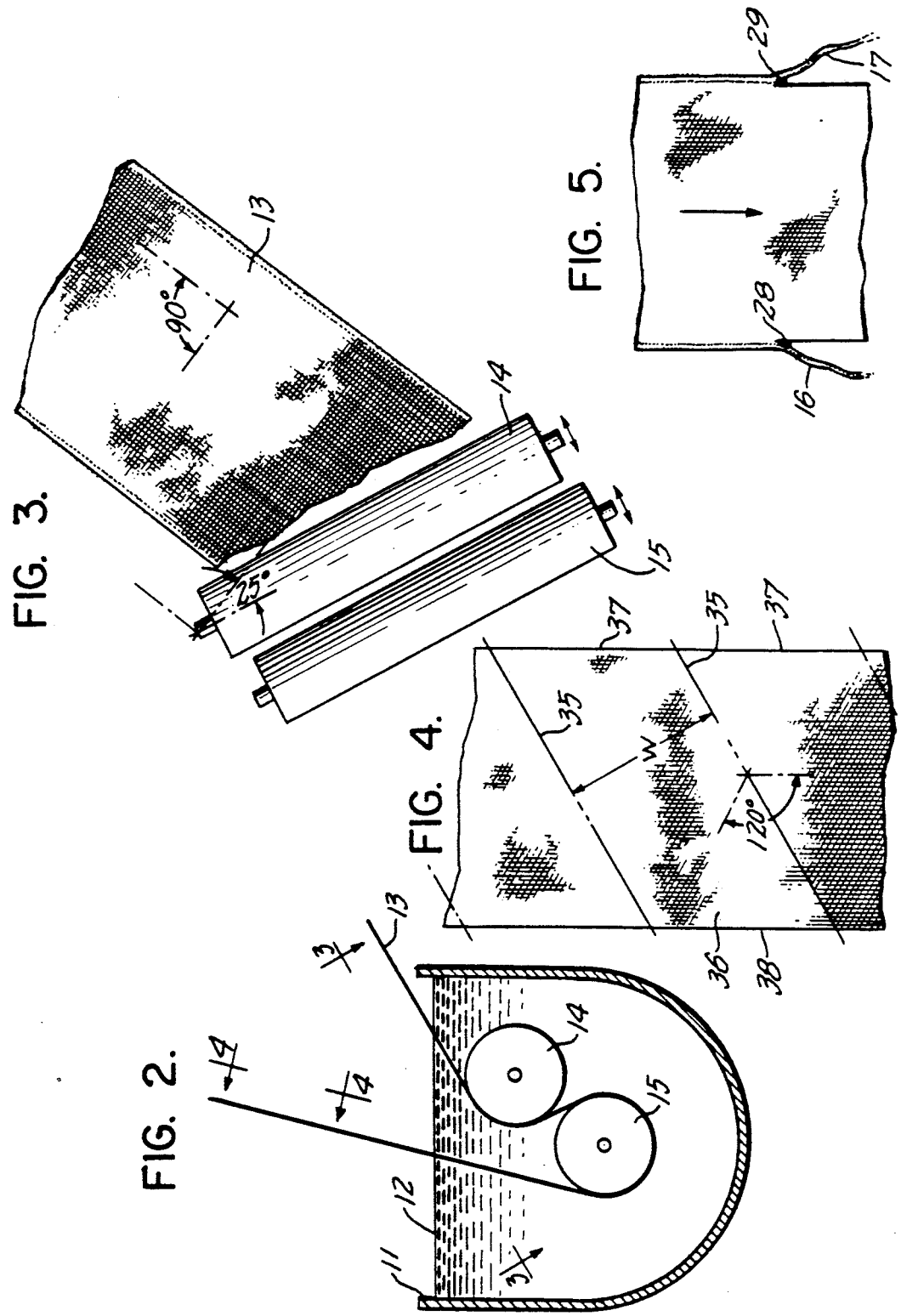

METHOD OF MAKING A REINFORCING FABRIC FOR POWER TRANSMISSION BELTS, HOSES AND THE LIKE

BACKGROUND AND SUMMARY OF THE INVENTION

In connection with the manufacture of endless power transmission belts, such as V-belts, gear belts, and the like, it is conventional to utilize a construction of fabric reinforced rubber or other elastomer. Typically, the belt structure includes a cord winding layer, which is located along the "neutral" axis of the belt. Cross sectional areas of the belts above and below the neutral axis are subject to flexing in tension and/or compression. In a typical endless belt, for example, outer portions of the belt cross section are flexed in tension, as the belt passes around the sheaves over which it is trained. The inner cross sectional portion of the belt are subjected to flexing in compression. For some installations, a single belt may be required to pass over both internal and external sheaves, such that both the inner and outer cross sectional portions thereof are flexed in both tension and compression.

In a transmission belt of conventional construction, strips of reinforcing fabric are incorporated into the elastomeric material of the belt, in the inner and outer cross sectional areas thereof, to impart stability to the belt geometry. Since these areas of the cross section undergo flexing in tension and/or compression, it has been customary to utilize bias-type fabric for the reinforcing material, so that the yarns of the fabric do not extend parallel to the longitudinal axis of the belt, but are arranged at angles thereto. Such reinforcing fabrics can be either wrapped around the exterior of the belt or incorporated internally thereof, or both.

Pursuant to prior practice, the manufacture of bias-type reinforcing fabric has been extremely labor intensive, and therefore costly, and at the same time less than optimally effective for the purpose. In one commonly used procedure, for example, tubular woven fabric is slit along a spiral at an angle of about 15° to the longitudinal axis of the fabric tube. The continuous strip resulting from the bias slitting of the tube has its yarns disposed asymmetrically with respect to the longitudinal axis of the fabric strip. The slit fabric strip is thereafter elongated to reorient the yarns, in an effort to align them approximately at a relative angle of about 120°. The length of slit fabric is impregnated with uncured elastomeric material and then banner cut into short sections, at an angle of about 60° to the axis of the warp yarns in the slit fabric. The banner cutting results in a series of rhomboid-shaped sections. These are rotated 90° and then spliced by overlapping. This results in a spliced length of material, in which the yarns are arranged at an angle of around 120°, symmetrical to the longitudinal axis of the spliced length. This assembled length is later slit into narrower strips, appropriate to the desired end use.

Because of crowding of the yarns at the edge extremities of the tubular woven material, a continuous length of the bias cut fabric has periodic diagonal non-uniformities. If allowed to remain in the fabric, these can result in undesirable puckering, bagging or wrinkling. Accordingly, it is sometimes necessary to cut away and discard these sections before banner cutting.

It will be readily apparent from the above that the manufacture and installation of conventional reinforcing materials is a significant labor factor in the manufacture of a power transmission belt. Bias fabrics manufactured in conventional ways have several additional inherent disadvantages. For one, the yarn angles, which ideally are normally about 120° (60° to the longitudinal axis), are very difficult to obtain and control with conventional, tubular woven fabrics. Precision in achieving the desired angle is difficult, and maintaining the angle thereafter during the manufacturing process is also difficult.

The present invention is directed to a novel and advantageous procedure for the manufacture of reinforcing fabrics, especially for transmission belts, hoses and the like, which is not only significantly more economical to produce than conventional fabrics, but provides a far superior component to the belt/hose manufacturer.

Pursuant to the present invention, the reinforcing fabric is not woven in tubular form, but is woven in flat form, advantageously on a high speed shuttleless machine. The woven starting material is more or less conventional in form, advantageously being of a poly/cotton composition. The particular yarn composition and fabric makeup can be varied to suit the requirements of the end user and is not, per se, a part of the present invention.

A conventionally flat woven fabric is further processed pursuant to the invention to impart thereto a significant bias construction. That is, the weft yarns are caused to be disposed at a substantial angle to the longitudinally extending warp yarns. Ideally, the weft yarns, after preliminary processing, are disposed at an angle of approximately 120° to the warp yarns. This is accomplished most advantageously by the use of a set of angularly disposed rollers, which cause one selvege of the woven fabric to be displaced and retarded, relative to the other, in the course of linear movement of the web during processing.

Pursuant to the invention, the fabric, after weaving, is directed through a treating bath wherein it is wet sufficiently to soften the sizing agent in the fabric. Thereafter, the fabric is subjected to a procedure, by angled rollers, special differential tentering, etc., in order to displace one selvege substantially with respect to the other in the longitudinal direction, to cause the weft yarns to be disposed at a 120°/60° angle to the warp yarns. The fabric is then retained in this condition while dried and stabilized.

After drying, the fabric advantageously is subjected to an edge slitting operation, most desirably by hot knives at each side, in order to remove the selvege portions. In this condition, the fabric can be rolled up and shipped to the belt/hose manufacturer.

The reinforcing fabric, which is the subject of the invention, is far superior to conventional tubular woven fabrics processed in the conventional way. Not only is the processing technique according to the invention significantly more economical, but it greatly simplifies the operations required by the belt/hose manufacturer and enables the product manufacturer to achieve a superior product.

For a more complete understanding of the above and other features and advantages of the invention, reference should be made to the following detailed description of a preferred embodiment of the invention, and to the accompanying drawing.

DESCRIPTION OF THE DRAWING

FIG. 1 is a simplified schematic diagram illustrating processing according to the invention of a flat woven fabric in order to produce a reinforcing material suitable for use in the manufacture of transmission belts, hoses and the like.

FIG. 2 is an enlarged, fragmentary illustration of a portion of the processing line of FIG. 1, illustrating the processing of the fabric to achieve bias configuration.

FIGS. 3 and 4 are fragmentary views taken generally along lines 3—3, 4—4 respectively of FIG. 2.

FIG. 5 is a fragmentary view illustrating hot knife trimming of selveges from the processed fabric.

DESCRIPTION OF A PREFERRED EMBODIMENT OF THE INVENTION

Figure 1:
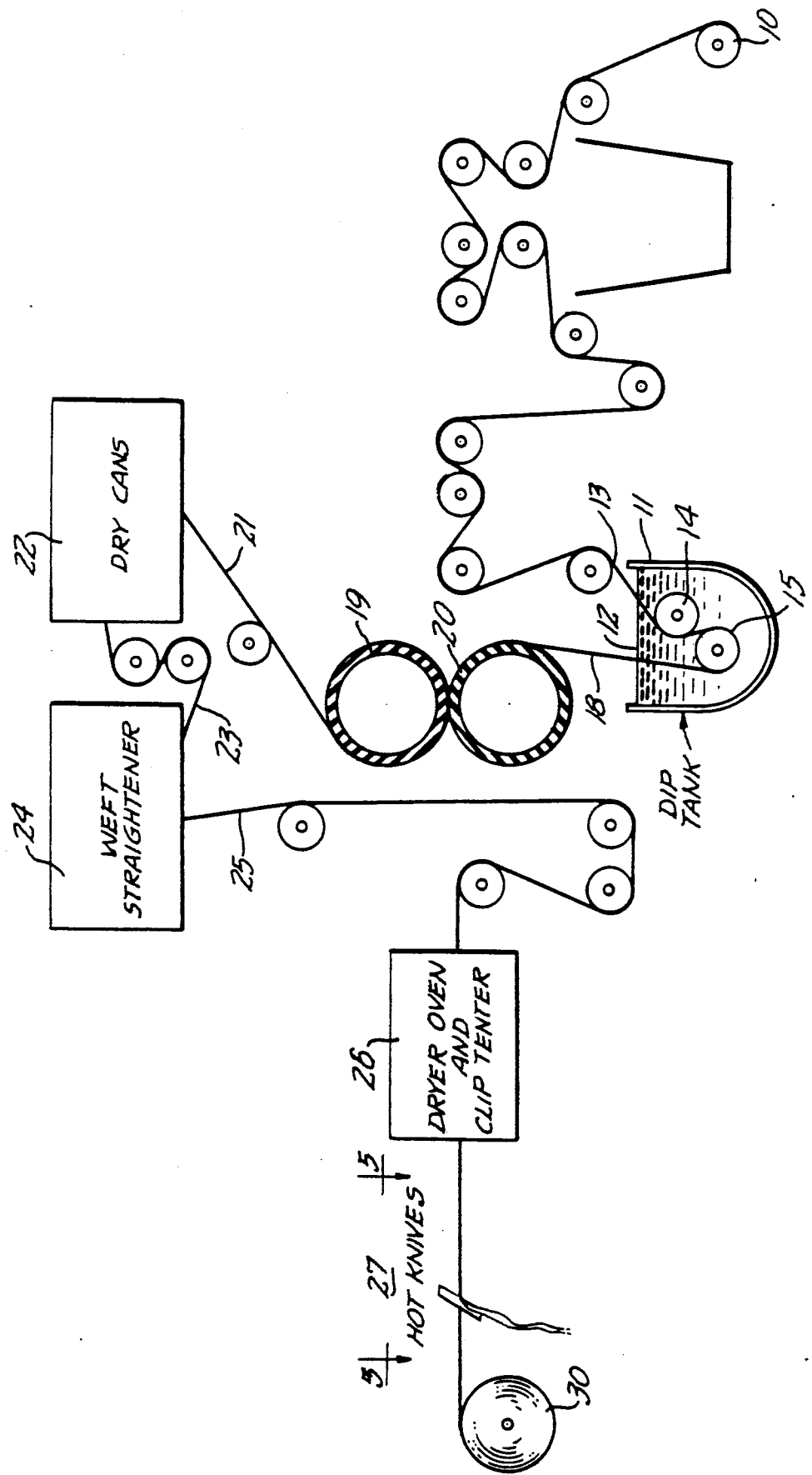

Referring now to the drawings, FIG. 1 illustrates at 10 a supply roll of flat woven fabric suitable for use as a reinforcing material for transmission belts, hoses and the like. Pursuant to the invention, the flat woven fabric is directed into a dip tank 11 containing a processing medium, advantageously warm water 12. The fabric web 13, entering the dip tank 11, is immersed in the warm liquid 12, which softens the sizing agent carried by the fabric. Desirably, the water in the dip tank is maintained at a temperature on the order of 130° F., which quickly softens the sizing agent.

Submerged in the dip tank 12 are processing rollers 14, 15, which are arranged at an angle of approximately 115°/65° to the longitudinal axis of the incoming web 13. The mounting of the rollers 14, 15 is adjustable, within limits, as reflected by the double headed arrows in FIG. 3, so that the precise angle of the rollers relative to the incoming fabric can be adjusted during processing to achieve the desired end result.

Pursuant to the invention, the incoming fabric, after entering the heated water bath 12, is soft and pliable, and the passage of the fabric under tension over the angularly disposed rollers 14, 15 causes the selveges 16, 17 to be displaced longitudinally, one with respect to the other, so that the fabric web 18 emerging from the bath 12 is in a bias form, as illustrated in FIG. 4, with the weft yarns disposed ideally at an angle of 120°/60° to the longitudinally extending warp yarns. Reorientation of the yarns may also be achieved using tenter means (not shown) arranged to engage the opposite selveges and displace one relative to the other.

After emerging from the dip tank 11, the now bias-oriented fabric 18 is passed through a pair of nip rollers 19, 20, desirably resiliently covered, which extract the excess liquid from the fabric. The extracted fabric 21 is then directed to a drier stage indicated generally at 22, which may be of an entirely conventional configuration consisting of a plurality of drier cans about which the fabric is sinuously directed to drive off a substantial portion of the residual water content. From the drier can section 22, the partially dried fabric 23 is directed to a weft straightener section indicated generally at 24. The straightener section 24 is of a common, conventional, commercially available type, well known to those skilled in the art. The weft straightener typically includes a plurality of rollers, not specifically illustrated, at least some of which are angularly adjustable relative to the motion of the fabric, in order to provide for adjustment of both bow and bias in the fabric. The weft straightener section is entirely conventional and does not, per se, form any part of the invention.

Within the weft straightener, the left angle is adjusted, if necessary, to conform to the desired of approximately 120°/60° to the warp yarns. The just processed fabric 25 is then directed to a tenter/oven 26, which also of conventional construction, wherein the fabric is gripped at its opposite selveges by tenter means, and retained at the desired weft bias orientation as it is carried through the dryer oven.

Temperatures in the oven are maintained at approximately 275° F. This both dries the fabric and stabilizes the sizing materials, so that the bias-oriented fabric is stabilized in its reoriented condition.

After emergence from the drier, the fabric is passed through a selvege trimming station 27, in which the opposite selveges 16, 17 of the fabric are removed, advantageously by means of hot knives 28, 29, as reflected in FIG. 5. The trimmed fabric is then wound on a roll 30 for delivery to the belt/hose manufacturer.

The fabric processed according to the invention provides a far superior medium for the belt/hose manufacturer to work with. In the first instance, the fabric provides a far more consistent bias configuration than is possible with the more conventional, tubular woven material, which has to first be cut on the bias and then further distorted to achieve a desired yarn orientation. Further, whereas with the tubular woven material, the bias slitting of the woven tube, followed by further distortion to derive a desired yarn bias typically results in a significantly irregular edge to the fabric, which in the end results in a trimmed-off waste. By contrast, with the bias web material produced according to the invention, the selveges are trimmed off by hot knife after all of the processing for yarn bias orientation has been completed. Accordingly, the edges of the web are precise and even, and are thus far easier to work with and result in less trim loss.

In a specific example according to the invention, a desirable starting material is a poly/cotton fabric constructed on a high speed flat shuttleless loom at a rate of, for example, 280 picks per minute. Yarn count may be 7.5/1×7.5/1, yielding a fabric of 7.9-8.3 ounces per square yard. Construction is 35×35, 2 ends/Dent. As a typical example, the poly/cotton mix may be 25% nylon, 75% cotton. The fabric, as constructed on the loom, normally contains the usual sizing materials, typically a blend of polyester resins, waxes and starches. The sizing materials are well known in the art and the specific sizing formulation is not critical.

Pursuant to the invention, the described fabric, drawn under tension from the supply roll 10, is immersed in the water bath 12 contained in the dip tank 11. This bath is desirably maintained at a temperature of about 130° F., sufficient to quickly soften the sizing agent in the fabric. Thereafter, the fabric passes over and about the rollers 14, 15, which advantageously are disposed in parallel relation to each other, but along axes disposed at an angle of about 115°/65° to the axis of the incoming fabric. The passage of the fabric over the bias rollers occurs after softening of the sizing agent, and is effective to displace one selvege relative to the other sufficiently to realign the weft yarns from their original 90° angle (to the warp yarns) to a desired angle of approximately 120°.

After reorientation of the yarns, the fabric passes through the squeeze rollers 19, 20, where the excess water is extracted from the fabric. Typically, the squeeze rollers reduce the water content of the fabric down to approximately to 100% of the weight of the dry fabric. Thereafter, the fabric is directed through the dryer can section 22, where time and temperature conditions are such as to reduce the water content further, to approximately 75% of the dry weight of the fabric.

The weft straightener section 24 is a wholly conventional, commercially available piece of equipment well known to those in the art and includes a series of rollers for controlling bow and bias. According to the process of the invention, at least one set of bias rolls (not specifically shown) is angularly adjustable, to enable "fine tuning" of the bias angle of the weft yarns, to impart a high level of precision in achieving the desired angle of, e.g. 120°. Typically it is easily possible to achieve bias angles within two degrees of specification.

After leaving the weft straightener, the fabric is engaged at its opposite by a clip tenter and is controllably guided through the drier section. Conditions in the drier section are maintained at about 275° F., to effectively dry the fabric and stabilize and set the sizing materials, without effecting any heat setting of the polyester components. A clip tenter is preferentially used in favor of a pin tenter, because the tenter typically will be required to impart lateral forces upon the fabric to retain its geometry during drying.

The fabric exiting the drier section is released by the clip tenter and directed to the windup roller 30. The fabric at this stage is accurately reoriented and stabilized. On route to the windup, the fabric has its opposite selveges trimmed, desirably by hot slitting, providing smooth accurate edges and an accurate width to the fabric, so that a precision roll of the finished fabric is provided at the windup.

The finished roll is a premium product for shipment to the belt or hose manufacturer. With conventionally manufactured, tubular woven fabrics, for example, it is necessary for the belt manufacturer to further process the fabric in order to achieve desired yarn orientation. This is not only difficult to achieve with accuracy, but leaves a fabric with uneven edges and non-uniform width. Normally trimming of the web edges, using conventional tubular woven fabric, is done after calendering with the rubber, resulting in excessive waste.

Additionally, with conventional fabrics, there are significant non-uniformities in the yarn placement, resulting from, among other things, the crowding of the yarns at the turn around area in the tubular weaving process. After spiral cutting of the woven tube, these areas of uneven yarn density appear as periodic diagonal non-uniform areas in the spiral cut web. At best, this results in product defects and in aggravated cases, the non-uniform areas may have to be cut out, in order to avoid puckering or other serious irregularities in the finished product. There is a resulting loss of material, and the operation is also highly labor intensive. With the product of the applicant's invention, by clear contrast, an entire length of web material collected at the windup 30 is of uniform width and yarn orientation throughout. In addition, because of the weaving technique, it is possible to construct the fabric two ends/-Dent, which provides a more even spacing of the warp yarns, enhancing uniformity of the eventual rubber penetration when the fabric is calendered.

Pursuant to the procedure of the invention, the bias-oriented web can be easily processed through the necessary calendering operations, in which the fabric is impregnated with the desired rubber composition, with straight tension on the warp yarns. By contrast, with spiral slit tubular woven fabric, the warp yarns are disposed at an angle to the longitudinal axis of the web, typically of around 9°. This imparts complicated stresses on the fabric web which can result in undesirable non-uniformities. Inasmuch as the fabric processed according to the invention may be manufactured in long, one piece rolls, with uniform edges and uniform width, processing at the manufacturer's stage is much more economical and is also much less subject to processing failure by reason of the failure of splices during processing.

After calendering, the fabric is banner cut and reoriented in the customary manner, and spliced, so that the yarns are oriented symmetrically to the longitudinal axis of the reconstructed web, e.g. at 60° to the longitudinal axis. As shown in FIG. 4, for example, the reoriented fabric, after calendering with rubber composition by the belt manufacturer, is banner cut along axes 35 oriented to substantially bisect the angle between the warp and weft yarns. The cut lines 35 are uniformly spaced, to form a plurality of rhomboid-like sections 36. These sections are then reoriented and spliced together with their edges 37, 38 slightly overlapped to form a new web, of width "W", the longitudinal axis of which is substantially symmetrical with the respective warp and weft yarns, at about 60° to each.

The final product constructed in accordance with the process of the invention is structurally superior to the conventional, because of the greater uniformity of yarn positioning and orientation. In addition, exceptional economies of manufacture can be realized, not only because of significantly less wastage of material and the elimination of defects, but also because of a reduction of labor requirements.

It should be understood, of course, that the specific form of the invention herein illustrated and described is intended to be representative only, as certain variations may be made therein without departing from the clear teachings of the disclosure. Accordingly, reference should be made to the following appended claims in determining the full scope of the invention.

I claim:

1. The process of constructing and processing a bias oriented reinforcing fabric for subsequent coating with a rubber compound, which comprises
    (a) forming a web of woven fabric including sizing agents by a suitable flat weaving procedure,
    (b) said web having warp and weft yarns, opposite sides, selvedge edges, and a longitudinal axis,
    (c) treating the web with heated liquid to soften the sizing agents in said fabric and wet said fabric,
    (d) differentially guiding and directing the opposite sides of the softened wet fabric to cause the weft yarns to be re-oriented to lie at an angle to the warp yarns substantially greater than 90°,
    (e) drying the re-oriented fabric to cause it to become geometrically stabilized while retaining said yarns substantially in their angularly re-oriented condition by engagement of the fabric by its selvedge edges, and
    (f) thereafter, but prior to coating said fabric with rubber compound, removing the selvedge edges from the stabilized dry fabric.

2. A process according to claim 1, further characterized by
    (a) said angle being approximately 120°.

3. A process according to claim 1, further characterized by (a) the web being treated to soften the sizing agents by immersion of the fabric in a bath of heated water, and (b) the differential guiding and directing of opposite sides of the fabric being effected by causing said treated fabric, while immersed in said bath, to pass over a pair of processing rollers disposed at an acute angle to the longitudinal axis of said web, of substantially less than 90°.

4. A process according to claim 3, further characterized by (a) said processing rollers being disposed at an angle of approximately 65° to the longitudinal axis of said web.

5. A process according to claim 3, further characterized by (a) said fabric, after processing by said rollers, is processed to remove excess water, (b) said fabric thereafter is dried at a temperature of at least about 275° F. but below heat set temperature, (c) said fabric, during the drying step is held by its opposite selvedge edges to retain yarn orientation.

6. A process according to claim 5, further characterized by (a) clip tenter means are employed to grip and retain said selvedge edges during drying.

7. A process according to claim 1, further characterized by (a) said fabric is of poly/cotton construction, and said selvedge edges are removed from the stabilized fabric by hot-knife slitting.

* * * * *